United States Patent
Rothman et al.

(10) Patent No.: US 12,186,690 B2
(45) Date of Patent: Jan. 7, 2025

(54) POLYMER COATING FOR SELECTIVE SEPARATION OF HYDROPHOBIC PARTICLES IN AQUEOUS SLURRY

(71) Applicant: CiDRA Corporate Services LLC, Wallingford, CT (US)

(72) Inventors: Paul J. Rothman, Windsor, CT (US); Mark R. Fernald, Enfield, CT (US); Paul Dolan, Portland, CT (US); Michael Ryan, Newtown, CT (US); Michael D. Coppola, Trumball, CT (US); Kevin Rodney Lassila, Bethany, CT (US); Allison K. Greene, West Hartford, CT (US)

(73) Assignee: CIDRA CORPORATE SERVICES INC., Wallingford, CT (US)

( * ) Notice: Subject to any disclaimer, the term of this patent is extended or adjusted under 35 U.S.C. 154(b) by 0 days.

(21) Appl. No.: 16/347,004

(22) PCT Filed: Nov. 2, 2017

(86) PCT No.: PCT/US2017/059650
§ 371 (c)(1),
(2) Date: May 2, 2019

(87) PCT Pub. No.: WO2018/085490
PCT Pub. Date: May 11, 2018

(65) Prior Publication Data
US 2020/0070074 A1    Mar. 5, 2020

Related U.S. Application Data (63) Continuation-in-part of application No. PCT/US2012/039534, filed on May 25, 2012.
(Continued)

(51) Int. Cl.
*B01D 37/02* (2006.01)
*B01D 63/08* (2006.01)
(Continued)

(52) U.S. Cl.
CPC .......... *B01D 37/02* (2013.01); *B01D 63/081* (2013.01); *B01D 69/02* (2013.01); *C09D 183/04* (2013.01);
(Continued)

(58) Field of Classification Search
None
See application file for complete search history.

(56) References Cited

U.S. PATENT DOCUMENTS 5,256,298 A * 10/1993 Powell ............... B01J 19/22
210/660
6,262,144 B1 * 7/2001 Zhao ............... C08F 265/06
523/201

(Continued)

FOREIGN PATENT DOCUMENTS

WO   WO-02066168 A1 *   8/2002   ............. B03D 1/023
WO   WO-2014186352 A1 * 11/2014   ............. C02F 1/288
(Continued)

OTHER PUBLICATIONS

Dimethyl Adipate, Wikipedia, https://en.wikipedia.org/wiki/Dimethyl_adipate, 2 total pages, retrieved Jan. 26, 2023. (Year: 2023 ).*
(Continued)

*Primary Examiner* — Jonathan M Peo
(74) *Attorney, Agent, or Firm* — Ware, Fressola, Maguire & Barber LLP (57) ABSTRACT

A substrate for use in an aqueous slurry has a polymeric coating to provide a compliant and sticky surface. The polymer coating has a chemical to render the surface hydrophobic so as to attract hydrophobic or hydrophobized min-
(Continued)

eral particles in the slurry. The substrate can take the form of a conveyor belt, a bead, a mesh, an impeller, a filter or a flat surface. The substrate can also be an open-cell foam. The polymeric coating can be modified with tackifiers; plasticizers; crosslinking agents; chain transfer agents; chain extenders; adhesion promoters; aryl or alky copolymers; fluorinated copolymers and/or additives; hydrophobicizing agents such as hexamethyldisilazane; inorganic particles such as silica, hydrophobic silica, and/or fumed hydrophobic silica; MQ resin; and/or other additives to control and modify the properties of the polymer.

23 Claims, 5 Drawing Sheets

Related U.S. Application Data (60) Provisional application No. 62/416,314, filed on Nov. 2, 2016, provisional application No. 61/533,544, filed on Sep. 12, 2011, provisional application No. 61/489,893, filed on May 25, 2011.

(51) Int. Cl.
  B01D 69/02  (2006.01)
  C09D 183/04 (2006.01)

(52) U.S. Cl.
  CPC ...... *B01D 2323/04* (2013.01); *B01D 2325/38* (2013.01)

(56) References Cited

U.S. PATENT DOCUMENTS

| | | | |
|---|---|---|---|
| 6,896,808 B1 | 5/2005 | Jay | |
| 7,004,326 B1* | 2/2006 | Dai | B03D 1/002 |
| | | | 209/166 |
| 8,349,188 B2* | 1/2013 | Soane | C02F 1/40 |
| | | | 210/776 |
| 10,413,847 B2 | 9/2019 | Rothman | |
| 2010/0294725 A1* | 11/2010 | Bush | C08L 79/02 |
| | | | 525/54.24 |
| 2012/0216951 A1* | 8/2012 | Kian | C09J 133/08 |
| | | | 156/273.3 |
| 2013/0193078 A1* | 8/2013 | Soane | C02F 1/56 |
| | | | 210/726 |
| 2014/0202959 A1 | 7/2014 | Rothman et al. | |
| 2014/0339172 A1* | 11/2014 | Rothman | B01J 20/328 |
| | | | 210/660 |
| 2015/0129506 A1* | 5/2015 | Snead | C02F 1/5272 |
| | | | 210/705 |
| 2015/0151308 A1 | 6/2015 | Davis | |
| 2016/0067631 A1 | 3/2016 | Rothman et al. | |

FOREIGN PATENT DOCUMENTS

| | | | |
|---|---|---|---|
| WO | WO-2015184436 A1 * | 12/2015 | ............ B03D 1/023 |
| WO | WO-2016182711 A1 * | 11/2016 | ............... C02F 1/58 |
| WO | 2017120569 A1 | 7/2017 | |

OTHER PUBLICATIONS

"Oligomer", Wikipedia, https://en.wikipedia.org/wiki/Oligomer, 3 total pages, retrieved Jan. 26, 2023. (Year: 2023).*
"Silicone", Wikipedia, https://en.wikipedia.org/wiki/Silicone, 3 total pages, obtained from Web on Jan. 26, 2023. (Year: 2023).*
Physical Chemistry, titled "Definitions for Hydrophilicity, Hydrophobicity, and Superhydrophobicity: Getting the Basics Right", J. Phys. Chem. Lett. 2014, 5, 686-688, 3 total pages. (Year: 2014).*
"Contact Angle Measurements and Wettability", Nanoscience Instruments, from Web May 1, 2024, <https://www.nanoscience.com/techniques/tensiometry/contact-angle-measurements-and-wettability/#:~:text=It%20is%20defined%20geometrically%20as,solid%2C%20liquid%2C%20and%2020liquid%2C%20and%20gas>, 14 pages. (Year: 2024).*
PSTC, "Loop Tack", Nov. 2013, (online) <URL: http://www.pstc.org/files/PSTC_16.pdf>, pp. 1.
Wikipedia, "Reticulated foam", Sep. 25, 2016, (online) <URL: https://en.wikipedia.org/w/index.php?title=Reticulated_foam&oldid=741057496>, pp. 1.

* cited by examiner

POLYMER COATING FOR SELECTIVE SEPARATION OF HYDROPHOBIC PARTICLES IN AQUEOUS SLURRY

CROSS-REFERENCE TO RELATED PATENT APPLICATIONS

This application corresponds to international patent application no. PCT/US2017/05650, filed 2 Nov. 2017, which claims benefit to, is a Continuation-In-Part of, and related to the following applications:

The present application claims the benefit of U.S. Provisional Patent Application No. 62/416,314, filed 2 Nov. 2016, entitled "Polymer coating for the selective separation of hydrophobic particles in aqueous slurry", which is incorporated by reference herein in its entirety.

The present application is also a continuation-in-part application of pending application PCT/US12/39534, filed 25 May 2012, entitled "Mineral separation using functionalized membrane", which claims the benefit of U.S. provisional application No. 61/489,893, filed 25 May 2011 and U.S. provisional application No. 61/533,544, filed 12 Sep. 2011, which are all incorporated by reference herein in their entirety.

This application is also related to a family of eight PCT applications, which were all concurrently filed on 25 May 2012, as follows:

PCT application no. PCT/US12/39528, entitled "Flotation separation using lightweight synthetic bubbles and beads;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest," which corresponds to U.S. Pat. No. 9,352,335;

PCT application no. PCT/US12/39591, entitled "Method and system for releasing mineral from synthetic bubbles and beads;"

PCT application no. PCT/US/39596, entitled "Synthetic bubbles and beads having hydrophobic surface;"

PCT application no. PCT/US/39631, entitled "Mineral separation using functionalized filters and membranes," which corresponds to U.S. Pat. No. 9,302,270;"

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column," all of which are incorporated by reference in their entirety.

This application also related to PCT application no. PCT/US2013/042202, filed 22 May 2013, entitled "Charged engineered polymer beads/bubbles functionalized with molecules for attracting and attaching to mineral particles of interest for flotation separation," which claims the benefit of U.S. Provisional Patent Application No. 61/650,210, filed 22 May 2012, which is incorporated by reference herein in its entirety.

This application is also related to PCT/US2014/037823, filed 13 May 2014, entitled "Polymer surfaces having a siloxane functional group," which claims benefit to U.S. Provisional Patent Application No. 61/822,679, filed 13 May 2013, which is incorporated by reference herein in its entirety.

This application also related to PCT application no. PCT/US13/28303, filed 28 Feb. 2013, entitled "Method and system for flotation separation in a magnetically controllable and steerable foam," which is also hereby incorporated by reference in its entirety.

This application also related to PCT application no. PCT/US16/57334, filed 17 Oct. 2016, entitled "Opportunities for recovery augmentation process as applied to molybdenum production," which is also hereby incorporated by reference in its entirety.

This application also related to PCT application no. PCT/US16/37322, filed 17 Oct. 2016, entitled "Mineral beneficiation utilizing engineered materials for mineral separation and coarse particle recovery," which is also hereby incorporated by reference in its entirety.

BACKGROUND OF THE INVENTION

1. Technical Field

This invention relates generally to a method and apparatus for separating valuable material from unwanted material in an aqueous mixture, such as a pulp slurry.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic, as well as to aid the formation of bubbles and the stability of the froth, and the air is used to carry the material to the surface of the flotation cell. When the hydrophobic material and the air bubbles collide they become attached to each other. The bubble rises to the surface carrying the desired material with it.

The performance of the flotation cell is dependent on the bubble surface area flux in the collection zone of the cell. The bubble surface area flux is dependent on the size of the bubbles and the air injection rate. Controlling the bubble surface area flux has traditionally been very difficult. This is a multivariable control problem and there are no dependable real time feedback mechanisms to use for control.

There is a need in the industry to provide a better way to separate valuable material from unwanted material, e.g., including in such a flotation cell, so as to eliminate problems associated with using air bubbles in such a separation process.

SUMMARY OF THE INVENTION

The present invention provides a substrate for use in an aqueous slurry. The substrate has a polymeric coating to provide a compliant and tacky surface. The polymeric coating also has a chemical to render the surface hydrophobic so as to attract hydrophobic or hydrophobized mineral particles in the slurry.

Thus, an aspect of the present invention is an apparatus, comprising:

a substrate arranged to contact an aqueous slurry, the aqueous slurry containing minerals and unwanted materials, the minerals comprising hydrophobic or hydrophobized mineral particles; and a polymeric coating disposed on the substrate, the polymeric coating comprising a compliant and tacky surface, the polymer coating further comprising a chemical to render the compliant and tacky surface hydrophobic so as to attract the hydrophobic or hydrophobized mineral particles.

According to an embodiment of the present invention, the polymeric coating is formed from a polymer selected from the group consisting of silicone; acrylics; butyl rubber; ethylene vinyl acetate; natural rubber; nitriles; styrene block copolymers with ethylene, propylene, and/or isoprene; polyurethanes; and polyvinyl ethers.

According to an embodiment of the present invention, the chemical comprises a siloxane derivative.

According to an embodiment of the present invention, the polymeric coating comprises a polymer modified with a material selected from the group consisting of tackifiers; plasticizers; crosslinking agents; chain transfer agents; chain extenders; adhesion promoters; aryl or alky copolymers; fluorinated copolymers and/or additives; hydrophobicizing agents such as hexamethyldisilazane; inorganic particles such as silica, hydrophobic silica, and/or fumed hydrophobic silica; MQ resin; and/or other additives to control and modify the properties of the polymer.

According to an embodiment of the present invention, the polymer is further modified with a chemical selected from the group consisting of with alkyl, aryl, and/or fluorinated functionalities; silica-based additives and other inorganics such as clays and/or bentonite; low molecular weight and oligomeric plasticizers; degrees of crosslinking density and branchedness (polymer structure); and/or POSS materials.

According to an embodiment of the present invention, the polymeric coating has a thickness ranged from 0.2 mils to 5.0 mils.

According to an embodiment of the present invention, the compliant and tacky surface has a tacky scale as measured by loop track against polished stainless steel using PSTC-16 Method A with loop tack in a range of 5 to 600 grams-force.

According to an embodiment of the present invention, the polymeric coating is reacted with additional functionality including oxyhydryl, sulfhydryl, or cationic functionality found in mineral collectors.

According to an embodiment of the present invention, the substrate comprises a flat surface, a belt, a bead, a mesh, a filter, an open-cell foam or an impeller.

According to an embodiment of the present invention, the substrate can be an open-cell foam made from reticulated polyurethane.

According to an embodiment of the present invention, the substrate comprises an open-cell foam made from a material selected from the group consisting of silicone, polychloroprene, polyisocyanurate, polystyrene, polyolefin, polyvinylchloride, epoxy, latex, fluoropolymer, phenolic, EPDM, and nitrile.

According to an embodiment of the present invention, the substrate comprises a three-dimensional open cellular structure made of hard plastic.

According to an embodiment of the present invention, the substrate comprises a solid, hollow, or network structure made of glass, metal, ceramic or polymer.

According to an embodiment of the present invention, the minerals comprise sulfide-based materials such as copper, gold, lead, zinc, nickel and iron.

According to an embodiment of the present invention, the minerals are further hydrophobized by addition of collector chemicals to the aqueous slurry, such as xanthate, dithiophosphate, dithiophosphinate, dithiocarbamate, thionocarbamate, hydroxamates, amine ethers, primary amines, fatty acids and their salts.

BRIEF DESCRIPTION OF THE DRAWING

FIG. 1 includes FIG. 1a and FIG. 1b, where

DETAILED DESCRIPTION OF THE INVENTION

The present invention provides an apparatus for use in an aqueous slurry containing minerals and unwanted materials. The minerals include hydrophobic or hydrophobized mineral particles. The apparatus comprises a substrate arranged to contact with the aqueous slurry and a polymeric coating disposed on the substrate. The polymeric coating has a compliant and tacky surface. The polymeric coating further comprises a chemical to render the surface hydrophobic so as to attract the hydrophobic or hydrophobized mineral particles.

According to an embodiment of the present invention, the polymeric coating provides a compliant, tacky surface of low energy to enhance selective collection of hydrophobic and hydrophobized particles ranging widely in particle size when distributed in an aqueous slurry. For example, the polymeric coating may be mounted on a substrate, such as a flat surface, belt, bead, mesh, filter, open cell foam structure, or other substrate.

By way of example, beads and bubbles are disclosed in commonly owned, copending U.S. patent application Ser. Nos. 14/116,438, filed Feb. 3, 2014; 14/117,209, filed Feb. 7, 2014, 12/039,631, filed May 25, 2012, 14/119,048, filed Feb. 14, 2014, and U.S. Pat. No. 9,352,335, which are all hereby incorporated by reference in their entirety.

By way of further example, open cell foam structures are disclosed in commonly owned U.S. Provisional Application Nos. 62/276,051, filed Jan. 7, 2016 and 62/405,569, filed Oct. 5, 2016, which are all also hereby incorporated by reference in their entirety.

By way of still further example, PDMS coating and other media coating materials are disclosed in commonly owned PCT application no. PCT/US2015/33485, filed Jun. 1, 2015, U.S. Pat. Nos. 9,352,335 and 9,731,221, which are all hereby incorporated by reference in their entirety.

As disclosed in the above references, the substrate coated with the polymeric coating may be disposed within the aqueous slurry for interaction with, and selective collection of, hydrophobic and hydrophobized particles. The aqueous slurry contains the hydrophobic and/or hydrophobized particles and may also contain unwanted particles that are less hydrophobic or are hydrophilic. For example, in the mining industry, aqueous mining slurries contain a mixture of minerals and other materials The other materials in the slurry are typically referred to as "gangue materials," and include various natural elements found in a mining deposit, such as sands, clays and other materials. Typically, the minerals and gangue material are ground to an average particle size. For example, depending on the mineral type, the average particle size of the mixture of minerals and gangue materials may range from fines of only several microns to coarse particles of greater than 800 microns. The ground minerals and gangue may be mixed with water to create the aqueous slurry. The minerals may be sulfide based minerals, such as copper, gold, lead, zinc, nickel, iron or other mineral. However, other minerals may be collected with the system of the present invention. Additionally, the minerals may be further hydrophobized by the addition of collector chemicals to the aqueous slurry, such as xanthate, dithiophosphate, dithiophosphinate, dithiocarbamate, thionocarbamate, hydroxamates, amine ethers, primary amines, fatty acids and their salts, and petroleum based collector chemistries commonly known in the mining industry. Additionally, where there is a mixture of hydrophobic and hydrophobized particles to be collected, together with other materials, such as gangue, within the slurry, depressants may be added to the aqueous slurry to reduce the hydrophobicity of the gangue materials or other materials that are not desired to be collected by the polymeric coating. Examples of common depressants include cyanide, zinc sulfate, sulfur dioxide, sodium hydrosulfide, sodium sulfide, Nokes reagent, phosphates, diethylenetriamine, triethylenetetramine, certain amphiphilic polymers often based on polyacrylamide, and natural products such as starch, dextrin, CMC, tannin, quebracho, and lignosulfonates.

The polymer of the polymeric coating may be comprised of a polysiloxane derivative, such as, but not limited to, polydimethylsiloxane. The polymer may be modified with: tackifiers; plasticizers; crosslinking agents; chain transfer agents; chain extenders; adhesion promoters; aryl or alky copolymers; fluorinated copolymers and/or additives; hydrophobizing agents such as hexamethyldisilazane; inorganic particles such as silica, hydrophobic silica, and/or fumed hydrophobic silica; MQ resin; and/or other additives to control and modify the properties of the polymer.

In another embodiment of the present invention, the coating may be comprised of other materials typically known as pressure sensitive adhesives, including, but not limited to: acrylics; butyl rubber; ethylene vinyl acetate; natural rubber; nitriles; styrene block copolymers with ethylene, propylene, and/or isoprene; polyurethanes; and polyvinyl ethers.

The materials listed above are formulated to be compliant and tacky with low surface energy. All of these polymers may be mono-, bi-, or multi-modal, and such materials may be modified with alkyl, aryl, and/or fluorinated functionalities; silica-based additives and other inorganics such as clays and/or bentonite; low molecular weight and oligomeric plasticizers; degrees of crosslinking density and branchedness (polymer structure); and/or POSS materials.

The modification in each case is to lower the surface energy and/or optimize compliance and tack. Very effective coatings were prepared from various modified silicones, acrylics, and ethylene vinyl acetate; however, all of the aforementioned polymers are effective if properly prepared to include the desired qualities of lower surface energy, compliance and tack.

The coating of the present invention has a hydrophobic surface with a contact angle $\theta_C$ greater than 90 degrees. A contact angle $\theta_C$ is the angle, conventionally measured through a liquid droplet on the surface of the material being measured, where a liquid-vapor interface meets the solid surface of the surface being measured. The contact angle $\theta_C$ quantifies the wettability of a solid surface by a liquid (the ability of a liquid to maintain contact with the solid surface) via the Young equation. A given system of solid, liquid, and vapor at a given temperature and pressure has a unique equilibrium contact angle. However, in practice contact angle hysteresis is observed, ranging from the so-called advancing (maximal) contact angle to the receding (minimal) contact angle. The equilibrium contact is within those values, and can be calculated from them. The equilibrium contact angle reflects the relative strength of the liquid, solid, and vapor molecular interaction.

The shape of a liquid-vapor interface is determined by the Young-Laplace equation, with the contact angle playing the role of a boundary condition via Young's Equation. The theoretical description of contact arises from the consideration of a thermodynamic equilibrium between the three phases: the liquid phase (L), the solid phase (S), and the gas or vapor phase (G) (which could be a mixture of ambient atmosphere and an equilibrium concentration of the liquid vapor). (The "gaseous" phase could be replaced by another immiscible liquid phase.) If the solid-vapor interfacial energy is denoted by $Y_{SG}$, the solid-liquid interfacial energy by $Y_{SL}$, and the liquid-vapor interfacial energy (i.e. the surface tension) by $Y_{LG}$, then the equilibrium contact angle $\theta_C$ is determined from these quantities by Young's Equation:

$$Y_{SG} - Y_{SL} - Y_{LG} \cos \theta_C = 0$$

To maximize selective collection of desired hydrophobic or hydrophobized particles distributed in an aqueous slurry, the contact angle $\theta_C$ of a drop of water on the surface of the coating should be greater than 90° signifying a hydrophobic surface. More preferably, the contact angle $\theta_C$ is between 100° and 140°. Very effective coatings have been prepared with contact angles greater than 120°.

The compliance of the coating is a factor in determining the collection efficiency of the hydrophobic particles on the coating as well as the distribution of particle sizes collected on the coating. A fully non-compliant hardened coating will not collect or only have very limited collection of fines (small micron size particles) whereas an extremely soft coating, while collecting a large range of particles, lacks the cohesion to durably remain on its substrate in repeated use. A moderately compliant coating allows particle adhesion while also possessing the cohesion necessary to remain on the substrate. The cohesion of the coating is directly related to the durability of the coating—the greater the cohesion of a particular coating, the greater the durability of that coating. Compliance is also affected by coating thickness; therefore, coating thickness is also an important parameter in hydrophobic particle collection efficiency. It is known that upon contact with a compliant surface, the compliance or "give" of the surface may allow greater surface to surface contact between the compliant surface and the object that comes in contact with the compliant surface. In contrast, a non-compliant, or hard, surface would not provide as much compliance, or give, when in contact with another object, providing less potential surface contact. The coating of the present invention is designed to include a compliant surface that provides increased surface area contact between the coating and a particle that comes in contact with the compliant coating; thereby enhancing adhesion forces. Coating thickness may be as low as 0.2 mils and greater than 5.0 mils, but is preferably greater than 0.75 mils (1 mils=25.4 microns). In general, coatings with low compliance preferentially collect smaller particle sizes while coatings with higher compliance collect a larger distribution of particle sizes.

Hydrophobic, compliant coatings have been prepared with minimal tack that exhibit particle collection; however, enhanced collection is generally achieved when the coating is tacky as measured by loop tack against polished stainless steel using PSTC-16 Method A. Loop tack is preferably greater than 5 grams-force, more preferably greater than 50 grams-force, and most preferably greater than 100 grams-force. Very effective coatings were prepared with loop tack of 300-600 grams-force.

The polymeric coating may be reacted with additional functionality allowing it to bond directly with a particle of interest. This functionality could include oxyhydryl, sulfhydryl, or cationic functionality found in mineral collectors.

The aforementioned coatings may be applied to any substrate effective in slurry processing. Substrates that may be coated include solid, hollow, or network structures made of glass, metal, ceramic, or polymer that may be smooth or have rough surface morphology to improve coating adhesion and/or to increase surface area. The substrate may be comprised of open-cell foam comprised of reticulated polyurethane or another appropriate open-cell foam material such as silicone, polychloroprene, polyisocyanurate, polystyrene, polyolefin, polyvinylchloride, epoxy, latex, fluoropolymer, phenolic, EPDM, nitrile, composite foams and such. The substrate may be comprised of other three-dimensional open cellular structures such as hard plastics, ceramics, carbon fiber, and metals may be used. Examples include Incofoam®, Duocel®, metal and ceramic foams produced by American Elements®, and porous hard plastics such as polypropylene honeycombs and such. The three-dimensional, open cellular structure may itself form a compliant, tacky surface of low energy by, for example, forming such a structure directly from the coating polymers as described above.

The coated substrate must contact the aqueous slurry, be removed from the slurry, and then the hydrophobic particles removed from the coated substrate to recover the valuable particles. This contact could occur within a flotation cell, an agitated tank, a tumbler or some other such known method of contact. The particle-rich coated substrate is then removed from the contactor and washed and/or blown to remove unwanted, unadhered gangue materials. Once any gangue material is removed, the hydrophobic particle laden substrate may be further processed to collect the attached materials, such as attached minerals, for further processing.

Hydrophobic mineral particles of interest may include but not be limited to hydrophobic and/or hydrophobized metallic or nonmetallic mineral particles, coal particles, diamond particles, or any hydrophobic particles of value.

Embodiment of Mineral Separation Apparatus

In its broadest sense, the present invention may take the form of a machine, system or apparatus featuring a first processor and a second processor. The first processor may be configured to receive a mixture of fluid, valuable material and unwanted material and a functionalized polymer coated member configured to attach to the valuable material in an attachment rich environment, and provide an enriched functionalized polymer coated member having the valuable material attached thereto. The second processor may be configured to receive a fluid and the enriched functionalized polymer coated member in a release rich environment to release the valuable material, and provide the valuable material released from the enriched functionalized polymer coated member to the release rich environment.

The apparatus may be configured to include one or more of the following features:

The first processor may take the form of a first chamber, tank, cell or column, and the second processor may take the form of a second chamber, tank, cell or column.

The first chamber, tank or column may be configured to receive a pulp slurry having water, the valuable material and the unwanted material in the attachment rich environment, which has a high pH, conducive to attachment of the valuable material.

The second chamber, tank or column may be configured to receive water in the release rich environment, which may have a low pH or receive ultrasonic waves conducive to release of the valuable material.

Although the invention is described as having a high pH in an attachment environment and a low pH in a release environment, the present invention will work equally as well where the pH of the attachment environment is selected to optimize the attachment of desired materials, such as a low, high or neutral pH, and the pH of the release environment is selected to be a different pH than the attachment environment and selected to optimize the release of the desired material.

The functionalized polymer coated member may take the form of a functionalized polymer coated impeller having at least one impeller blade configured to rotate slowly inside the first processor and the second processor. The first processor may be configured to receive the at least one impeller blade in an attachment zone, and provide at least one enriched impeller blade having the valuable material attached thereto in the attachment zone. The second processor may be configured to receive the at least one enriched impeller blade in a release zone and to provide the valuable material released from the at least one enriched impeller blade. The first processor may be configured with a first transition zone to provide drainage of tailings, and the second processor may be configured with a second transition zone to provide drainage of concentrate.

As used herein with respect to functionalized polymer, the term "enriched" is intended to refer to a functionalized material that has been exposed to a material of interest, and wherein the material of interest has been attached, attracted, connected or otherwise collected by the functionalized material prior to release.

The functionalized polymer coated member may take the form of a functionalized polymer coated conveyor belt configured to run between the first processor and the second processor. The first processor may be configured to receive the functionalized polymer coated conveyor belt and provide an enriched functionalized polymer coated conveyor belt having the valuable material attached thereto. The second processor may be configured to receive the enriched functionalized polymer coated conveyor belt and provide the valuable material released from the enriched functionalized polymer coated conveyor belt. The functionalized polymer coated conveyor belt may be made of a mesh material.

The functionalized polymer coated member may take the form of a functionalized polymer coated collection filter configured to move between the first processor and the second processor as part of a batch type process. The first processor may be configured to receive the functionalized polymer coated collection filter and to provide an enriched functionalized polymer coated collection filter having the valuable material attached thereto. The second processor device may be configured to receive the enriched functionalized polymer coated collection filter and provide the valuable material released from the enriched functionalized polymer coated collection filter.

The first processor may be configured to provide tailings containing the unwanted material, and the second processor may be configured to provide a concentrate containing the valuable material.

The functionalized polymer coated member may take the form of a membrane or a thin soft pliable sheet or layer.

According to some embodiment, the present invention may also take the form of apparatus featuring first means that may be configured to receive a mixture of fluid, valuable material and unwanted material and a functionalized polymer coated member configured to attach to the valuable material in an attachment rich environment, and provide an enriched functionalized polymer coated member having the valuable material attached thereto; and second means that may be configured to receive a fluid and the enriched functionalized polymer coated member in a release rich environment to release the valuable material, and provide the valuable material released from the enriched functionalized polymer coated member to the release rich environment.

According to some embodiments of the present invention, the first means may be configured to receive a pulp slurry having water, the valuable material and the unwanted material in the attachment rich environment, which has a high pH, conducive to attachment of the valuable material; and the second means may be configured to receive water in the release rich environment, which has a low pH or receives ultrasonic waves conducive to release of the valuable material.

According to some embodiments of the present invention, the functionalized polymer coated member may take the form of one of the following:

a functionalized polymer coated impeller having at least one impeller blade configured to rotate slowly inside the first means and the second means;

a functionalized polymer coated conveyor belt configured to run between the first means and the second means; or a functionalized polymer coated collection filter configured to move between the first means and the second means as part of a batch type process.

Embodiments of Mineral Separation Processes or Methods

According to some embodiment, the present invention may also take the form of a process or method featuring receiving in a first processor a mixture of fluid, valuable material and unwanted material and a functionalized polymer coated member configured to attach to the valuable material in an attachment rich environment, and providing from the first processor an enriched functionalized polymer coated member having the valuable material attached thereto; and receiving in a second processor a fluid and the enriched functionalized polymer coated member in a release rich environment to release the valuable material, and providing the valuable material released from the enriched functionalized polymer coated member to the release rich environment.

According to some embodiments of the present invention, the method may include being implemented consistent with one or more of the features set forth herein.

The Synthetic Functionalized Polymer Coated Member Chemistry

According to some embodiments of the present invention, the functionalized polymer coated member may take the form of a solid-phase body comprising a surface in combination with a plurality of molecules attached to the surface, the molecules comprising a functional group selected for attracting or attaching to one or more mineral particles of interest to the molecules. The term "polymer" in this specification is understood to mean a large molecule made of many units of the same or similar structure linked together.

According to some embodiments of the present invention, the solid-phase body may be made of a synthetic material comprising the molecules. By way of example, the synthetic material may be selected from a group consisting of, but not limited to, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin and polydimethylsiloxane.

According to some embodiments of the present invention, the solid-phase body may include an inner material and a shell providing the surface, the shell being made of a synthetic material comprising the molecules.

According to some embodiments of the present invention, the functional group may have an ionic group, which may be either anionic or cationic, for attracting or attaching the mineral particles to the surface.

According to some embodiments of the present invention, the functional group may take the form of a collector having a non-ionizing bond having a neutral or ionic functional group, or having an ionizing bond.

According to some embodiments of the present invention, the ionizing bond may be an anionic bond or a cationic bond. The anionic functional group may be comprised of an oxyhydryl, including carboxylic, sulfates and sulfonates, and sulfhydral bond.

Hydrophobicity

According to some embodiments of the present invention, the surface of the polymer coated member may be functionalized to be hydrophobic so as to provide a bonding between the surface and a mineral particle associated with one or more hydrophobic molecules.

Furthermore, the polymer can be naturally hydrophobic or functionalized to be hydrophobic. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The mineral particle of interest or the valuable material associated with one or more hydrophobic molecules is referred to as a wetted mineral particle. When the pulp slurry contains a plurality of collectors or collector molecules, some of the mineral particles will become wetted mineral particles if the collectors are attached to mineral particles. Xanthates can be used in the pulp slurry as the collectors. The functionalized polymer coated member can be coated with hydrophobic silicone polymer including polysiloxanates so that the functionalized polymer coated member become hydrophobic. The functionalized polymer coated member can be made of hydrophobic polymers, such as polystyrene and polypropylene to provide the desired hydrophobicity.

Combined Collector/Hydrophobic Functionalized Polymer Coated Member

According to some embodiments of the present invention, only a part of the surface of the functionalized polymer coated member may be configured to have the molecules attached thereto, wherein the molecules comprise collectors.

According to some embodiments of the present invention, a part of the surface of the functionalized polymer coated member may be configured to have the molecules attached thereto, wherein the molecules comprise collectors, and another part of the surface of the functionalized polymer coated member may be configured to be hydrophobic.

According to some embodiments of the present invention, a part of the surface of the functionalized polymer coated member may be configured to be hydrophobic.

Release of Minerals from Compliant, Tacky Surface

The compliant, tacky surface, according to the present invention, has a polymeric coating to render the surface hydrophobic so as to attract mineral particles in the slurry. To collect the mineral particles, a surfactant can be used to lower the surface tension of the polymeric coating so as to release the minerals from the surface. Suitable surfactants can include alcohols, liquid silicones, various emulsions containing combinations of alcohols and silicones, or other suitable surfactants or other suitable materials. Along with the surfactant, rotating impellers can be used to stir the container having the surfactant and the mineral laden surface to aid the release.

Alternatively, the attached mineral particles can be washed off (with the release being chemically triggered—e.g., a low pH environment), mechanically released (e.g., ultrasonic agitation, brushes, squeegee contact), thermally, or electromagnetically released.

Figure 1A:
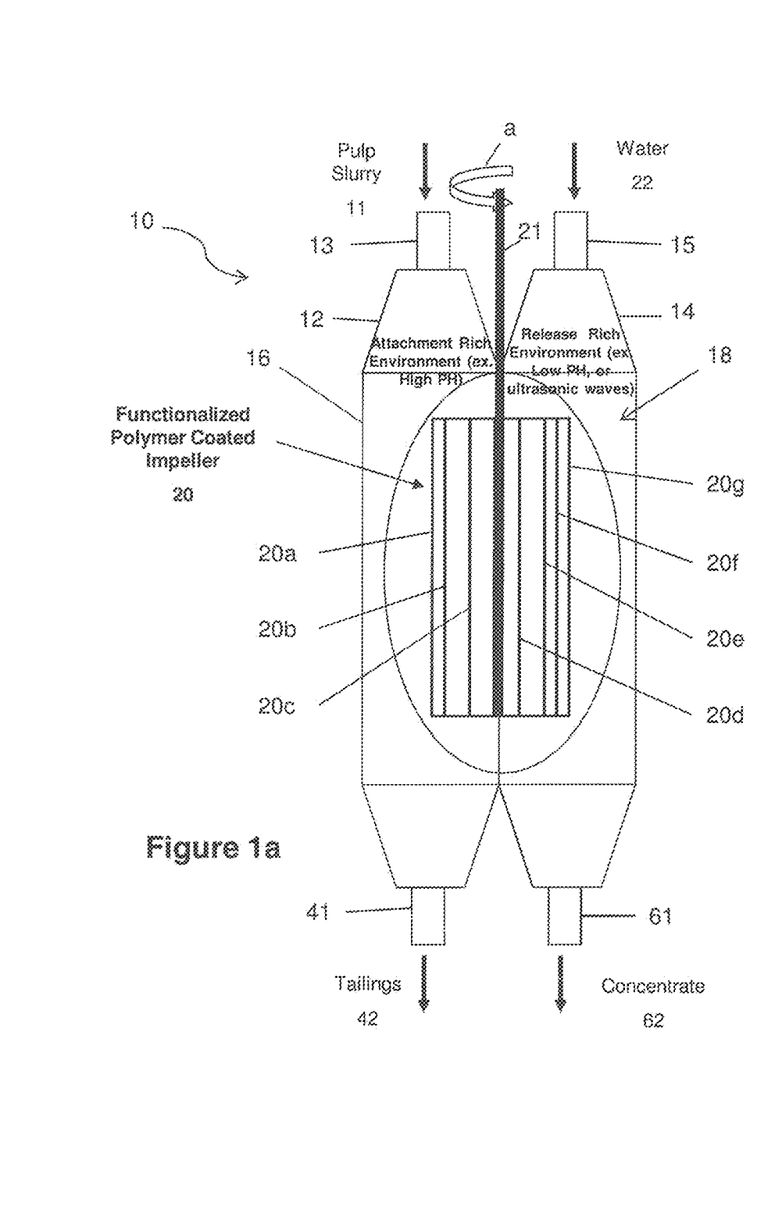
FIG. 1a is a side partial cutaway view in diagram form of a separation processor configured with two chambers, tanks or columns having a functionalized polymer coated impeller arranged therein according to some embodiments of the present invention.
Figure 1B:
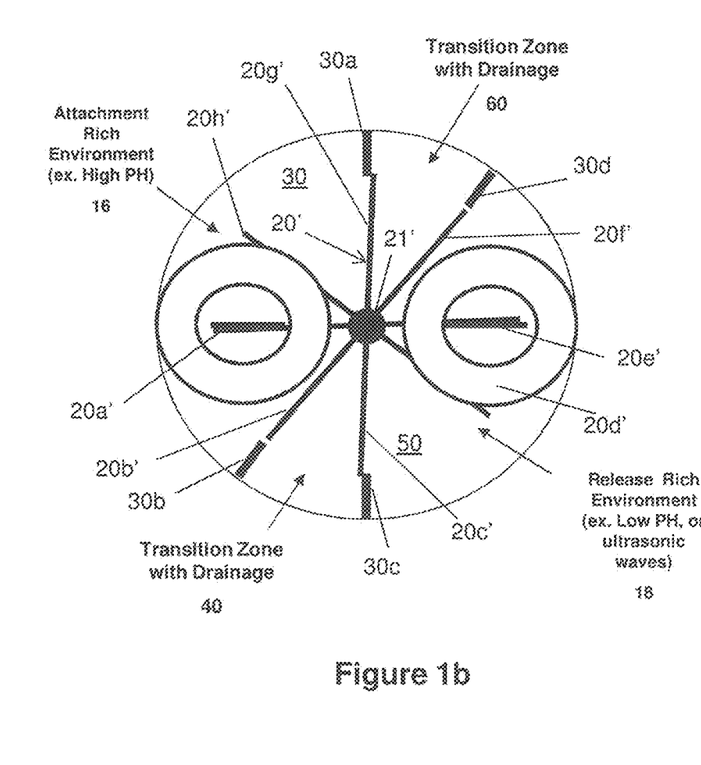
FIG. 1b is a top partial cross-sectional view in diagram form of a functionalized polymer coated impeller moving in an attachment rich environment contained in an attachment chamber, tank or column and also moving in a release rich environment contained in a release chamber, tank or column according to some embodiments of the present invention.

FIGS. 1, 1a, 1b

By way of example, FIG. 1 shows the present invention is the form of a machine, device, system or apparatus 10, e.g., for separating valuable material from unwanted material in a mixture 11, such as a pulp slurry, using a first processor 12 and a second processor 14. FIG. 1 includes FIG. 1a and FIG. 1b, where FIG. 1a is a side partial cutaway view in diagram form of a separation processor configured with two chambers, tanks or columns having a functionalized polymer coated impeller arranged therein according to some embodiments of the present invention, and FIG. 1b is a top partial cross-sectional view in diagram form of a functionalized polymer coated impeller moving in an attachment rich environment contained in an attachment chamber, tank or column and also moving in a release rich environment contained in a release chamber, tank or column. The first processor 12 and the second processor 14 are configured with a functionalized polymer coated member that is shown, e.g., as a functionalized polymer coated impeller 20 (FIG. 1a), 20' (FIG. 1b), according to some embodiments of the present invention. In operation, the impeller 20, 20' slowly rotates in relation to the first processor 12 and the second processor 14, the impeller blades slowly pass through the attachment rich environment 16 in the first processor 12 where the valuable material is attached to the blades and through the release rich environment 18 in the second processor 14 is released from the blades. By way of example, the impeller 20 is shown rotating in a counter-clockwise direction as indicated by arrow a, although the scope of the invention is not intended to be limited to the direction of the impeller rotation, or the manner in which the functionalized polymer coated impeller 20 (FIG. 1a), 20' (FIG. 1b) is arranged, mounted, or configured in relation to the first processor 12 and the second processor 14.

The first processor 12 may take the form of a first chamber, tank, cell or column that contains an attachment rich environment generally indicated as 16. The first chamber, tank or column 12 may be configured to receive via piping 13 the mixture or pulp slurry 11 in the form of fluid (e.g., water), the valuable material and the unwanted material in the attachment rich environment 16, e.g., which has a high pH, conducive to attachment of the valuable material. The second processor 14 may take the form of a second chamber, tank, cell or column that contains a release rich environment generally indicated as 18. The second chamber, tank, cell or column 14 may be configured to receive via piping 15, e.g., water 22 in the release rich environment 18, e.g., which may have a low pH or receive ultrasonic waves conducive to release of the valuable material. Attachment rich environments like that forming part of element environment 16 conducive to the attachment of a valuable material of interest and release rich environments like that forming part of environment 18 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 16 and a corresponding release rich environment like environment 18 based on the separation technology disclosed herein for any particular valuable mineral of interest, e.g., copper, forming part of any particular mixture or slurry pulp.

Although the invention is described as having a high pH in an attachment environment and a low pH in a release environment, embodiments are envisioned in which the invention will work equally as well where the pH of the attachment environment is selected to optimize the attachment of desired materials, such as a low, high or neutral pH, and the pH of the release environment is selected to be a different pH than the attachment environment and selected to optimize the release of the desired material.

In operation, the first processor 12 may be configured to receive the mixture or pulp slurry 11 of water, valuable material and unwanted material and the functionalized polymer coated member that is configured to attach to the valuable material in the attachment rich environment 16. In FIG. 1, the functionalized polymer coated member is shown as the functionalized polymer coated impeller 20 (FIG. 1a), 20' (FIG. 1b). In FIG. 1a, the functionalized polymer coated impeller 20 has a shaft 21 and at least one impeller blade 20a, 20b, 20c, 20d, 2e, 20f, 20g and is configured to rotate slowly inside the first processor 12 and the second processor 14. In FIG. 1b, the functionalized polymer coated impeller 20' has a shaft 21' and impeller blades 20a', 20b', 20c', 20d', 2e', 20f', 20g' and 20h'. Each impeller blade in FIG. 1 is understood to be configured and functionalized with a polymer coating to attach to the valuable material in the attachment rich environment 16. (The scope of the invention is not intended to be limited to the number of blades on the impeller 20, 20' and the embodiment in FIGS. 1*a* and 1*b* is shown with impellers 21, 21' having a different number of blades.)

In FIG. 1, the first processor 12 is configured to receive at least one impeller blade of the functionalized polymer coated impeller 20 (FIG. 1*a*), 20' (FIG. 1*b*). In FIG. 1*b*, the at least one impeller blade is shown as impeller blade 20*g'* being received in an attachment zone 30 that forms part of the attachment rich environment 16 defined by walls 30*a*, 30*b*. The first processor 12 may also be configured with a first transition zone generally indicated as 40 to provide drainage from piping 41 of, e.g., tailings 42 as shown in FIG. 1*a*.

The first processor 12 may also be configured to provide at least one enriched impeller blade having the valuable material attached thereto, after passing through the attachment rich environment 16. In FIG. 1*b*, the at least one enriched impeller blade is shown as the at least one enriched impeller blade 20*c'* being provisioned from the attachment rich environment 16 in the first processor 12 to the release rich environment 18 in the second processor 14.

The second processor 14 may be configured to receive via the piping 15 the fluid 22 (e.g. water) and the enriched functionalized polymer coated member to release the valuable material in the release rich environment 18. In FIG. 1*b*, the second processor 14 is shown receiving the enriched impeller blade 20*c'* in a release zone 50, e.g., that forms part of the release rich environment 18 and is defined, e.g., by walls 30*c* and 30*d*.

The second processor 14 may also be configured to provide the valuable material that is released from the enriched functionalized polymer coated member into the release rich environment 18. For example, in FIG. 1*b* the second processor 14 is shown configured with a second transition zone 60 defined by walls 30*a* and 30*d* to provide via piping 61 drainage of the valuable material in the form of a concentrate 62 (FIG. 1*a*).

Figure 2:
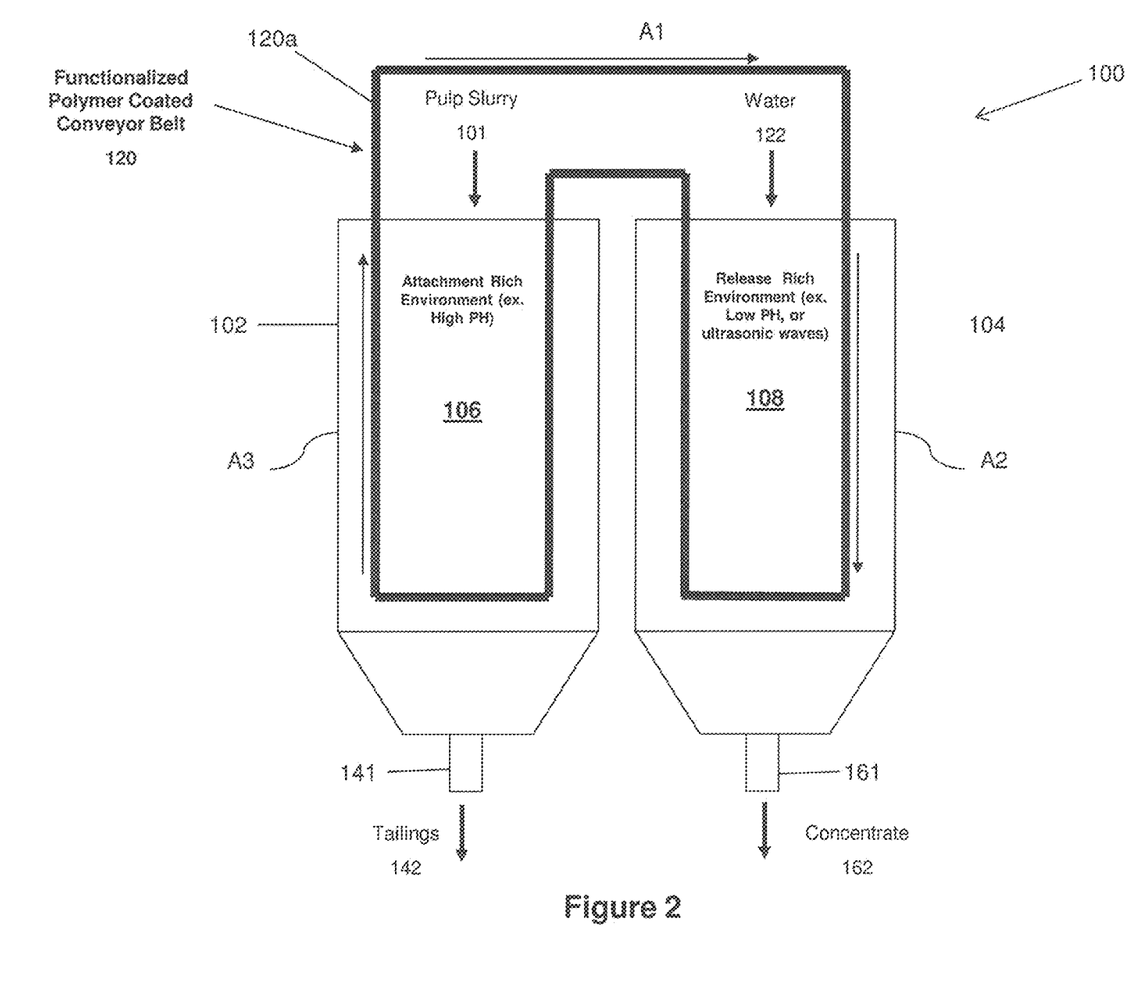
FIG. 2 is diagram of a separation processor configured with two chambers, tanks or columns having a functionalized polymer coated conveyor belt arranged therein according to some embodiments of the present invention.

FIG. 2: The Functionalized Polymer Coated Conveyor Belt

By way of example, FIG. 2 shows the present invention is the form of a machine, device, system or apparatus 100, e.g., for separating valuable material from unwanted material in a mixture 101, such as a pulp slurry, using a first processor 102 and a second processor 104. The first processor 102 and the second processor 104 are configured with a functionalized polymer coated member that is shown, e.g., as a functionalized polymer coated conveyor belt 120 that runs between the first processor 102 and the second processor 104, according to some embodiments of the present invention. The arrows A1, A2, A3 indicate the movement of the functionalized polymer coated conveyor belt 120. Techniques, including motors, gearing, etc., for running a conveyor belt like element 120 between two processors, such as elements 102 and 104 are known in the art, and the scope of the invention is not intended to be limited to any particular type or kind thereof either now known or later developed in the future. According to some embodiments of the present invention, the functionalized polymer coated conveyor belt 120 may be made of a mesh material.

The first processor 102 may take the form of a first chamber, tank, cell or column that contains an attachment rich environment generally indicated as 106. The first chamber, tank or column 102 may be configured to receive the mixture or pulp slurry 101 in the form of fluid (e.g., water), the valuable material and the unwanted material in the attachment rich environment 106, e.g., which has a high pH, conducive to attachment of the valuable material. The second processor 104 may take the form of a second chamber, tank, cell or column that contains a release rich environment generally indicated as 108. The second chamber, tank, cell or column 104 may be configured to receive, e.g., water 122 in the release rich environment 108, e.g., which may have a low pH or receive ultrasonic waves conducive to release of the valuable material. Consistent with that stated above, attachment rich environments like that forming part of element environment 106 conducive to the attachment of a valuable material of interest and release rich environments like that forming part of environment 108 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 106 and a corresponding release rich environment like environment 108 based on the separation technology disclosed herein for any particular valuable mineral of interest, e.g., copper, forming part of any particular mixture or slurry pulp.

In operation, the first processor 102 may be configured to receive the mixture or pulp slurry 101 of water, valuable material and unwanted material and the functionalized polymer coated conveyor belt 120 that is configured to attach to the valuable material in the attachment rich environment 106. In FIG. 2, the belt 120 is understood to be configured and functionalized with a polymer coating to attach to the valuable material in the attachment rich environment 106.

The first processor 102 may also be configured to provide drainage from piping 141 of, e.g., tailings 142 as shown in FIG. 2.

The first processor 102 may also be configured to provide an enriched functionalized polymer coated conveyor belt having the valuable material attached thereto, after passing through the attachment rich environment 106. In FIG. 2, the enriched functionalized polymer coated conveyor belt is shown, e.g., as that portion or part 120*a* of the belt 120 being provisioned from the attachment rich environment 106 in the first processor 102 to the release rich environment 108 in the second processor 104. It is understood that some other portions or parts of the belt 120 may be enriched, including the portion or part immediately leaving the attachment rich environment 106, as well as the portion or part immediately entering the release rich environment 108.

The second processor 14 may be configured to receive the fluid 122 (e.g. water) and the portion 120*a* of the enriched functionalized polymer coated conveyor belt 120 to release the valuable material in the release rich environment 108.

The second processor 104 may also be configured to provide the valuable material that is released from the enriched functionalized polymer coated member into the release rich environment 108. For example, in FIG. 2 the second processor 104 is shown configured to provide via piping 161 drainage of the valuable material in the form of a concentrate 162.

In FIG. 2, the first processor 102 is configured with the functionalized polymer coated conveyor belt 120 passing through with only two turns inside the attachment rich environment 106. However, embodiments are envisioned in which the first processor 102 may be configured to process the functionalized polymer coated conveyor belt 120 using a serpentine technique for winding or turning the belt 120 one way and another way, back and forth, inside the first processor to maximize surface area of the belt inside the processor 102 and exposure of the belt 120 to the attachment rich environment 106.

Figure 3:
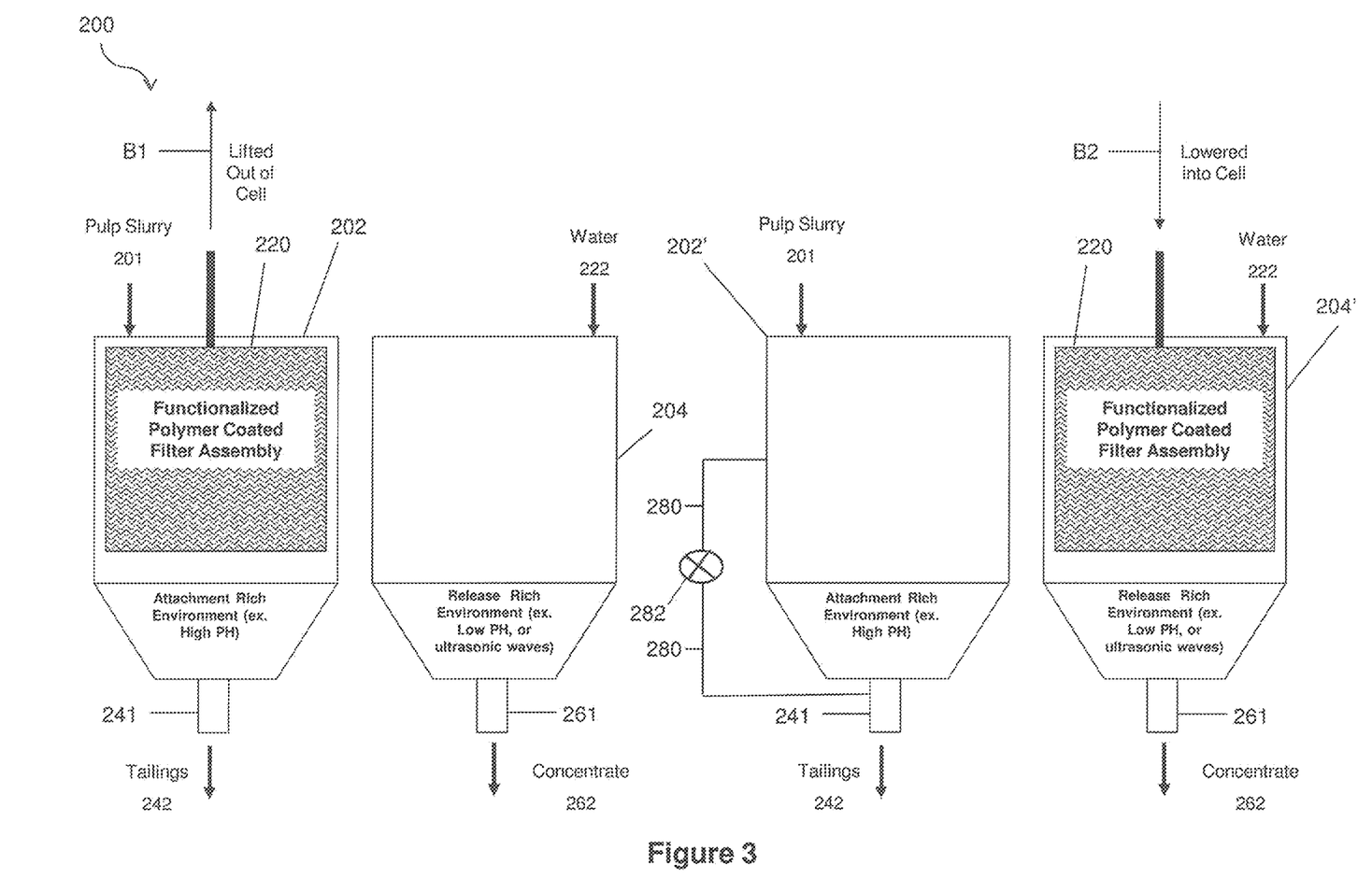
FIG. 3 is diagram of a separation processor configured with a functionalized polymer coated filter assembly for moving between two chambers, tanks or columns in a semi-continuous batch process according to some embodiments of the present invention.

FIG. 3: The Functionalized Polymer Coated Filter

By way of example, FIG. 3 shows the present invention is the form of a machine, device, system or apparatus 200, e.g., for separating valuable material from unwanted material in a mixture 201, such as a pulp slurry, using a first processor 202, 202' and a second processor 204, 204'. The first processor 202 and the second processor 204 are configured to process a functionalized polymer coated member that is shown, e.g., as a functionalized polymer coated collection filter 220 configured to be moved between the first processor 202 and the second processor 204' as shown in FIG. 3 as part of a batch type process, according to some embodiments of the present invention. In FIG. 3, by way of example the batch type process is shown as having two first processors 202, 202' and second processors 204, 204, although the scope of the invention is not intended to be limited to the number of first or second processors. Moreover, embodiments are envisioned using a different number of first and second processors, different types or kinds of processors, as well as different types or kinds of processors both now known or later developed in the future. According to some embodiments of the present invention, the functionalized polymer coated collection filter 220 may take the form of a membrane or a thin soft pliable sheet or layer. The arrow B1 indicates the movement of the functionalized polymer coated filter 220 from the first processor 202, and the arrow B2 indicates the movement of the functionalized polymer coated collection filter 220 into the second processor 202. Techniques, including motors, gearing, etc., for moving a filter like element 220 from one processor to another processor like elements 202 and 204 are known in the art, and the scope of the invention is not intended to be limited to any particular type or kind thereof either now known or later developed in the future.

The first processor 202 may take the form of a first chamber, tank, cell or column that contains an attachment rich environment generally indicated as 206. The first chamber, tank or column 102 may be configured to receive the mixture or pulp slurry 201 in the form of fluid (e.g., water), the valuable material and the unwanted material in the attachment rich environment 206, e.g., which has a high pH, conducive to attachment of the valuable material. The second processor 204 may take the form of a second chamber, tank, cell or column that contains a release rich environment generally indicated as 208. The second chamber, tank, cell or column 204 may be configured to receive, e.g., water 222 in the release rich environment 208, e.g., which may have a low pH or receive ultrasonic waves conducive to release of the valuable material. Consistent with that stated above, attachment rich environments like that forming part of element environment 206 conducive to the attachment of a valuable material of interest and release rich environments like that forming part of environment 208 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 206 and a corresponding release rich environment like environment 208 based on the separation technology disclosed herein for any particular valuable mineral of interest, e.g., copper, forming part of any particular mixture or slurry pulp.

In operation, the first processor 202 may be configured to receive the mixture or pulp slurry 101 of water, valuable material and unwanted material and the functionalized polymer coated collection filter 220 that is configured to attach to the valuable material in the attachment rich environment 206. In FIG. 3, the functionalized polymer coated collection filter 220 is understood to be configured and functionalized with a polymer coating to attach to the valuable material in the attachment rich environment 106.

The first processor 202 may also be configured to provide drainage from piping 241 of, e.g., tailings 242 as shown in FIG. 3.

The first processor 202 may also be configured to provide an enriched functionalized polymer coated collection filter having the valuable material attached thereto, after soaking in the attachment rich environment 106. In FIG. 3, the enriched functionalized polymer coated collection filter 220 is shown, e.g., being provisioned from the attachment rich environment 206 in the first processor 202 to the release rich environment 208 in the second processor 204.

The second processor 204 may be configured to receive the fluid 222 (e.g. water) and the enriched functionalized polymer coated collection filter 220 to release the valuable material in the release rich environment 208.

The second processor 204 may also be configured to provide the valuable material that is released from the enriched functionalized polymer coated collection filter 220 into the release rich environment 208. For example, in FIG. 3 the second processor 204 is shown configured to provide via piping 261 drainage of the valuable material in the form of a concentrate 262.

The first processor 202' may also be configured with piping 280 and pumping 280 to recirculate the tailings 242 back into the first processor 202'. The scope of the invention is also intended to include the second processor 204' being configured with corresponding piping and pumping to recirculate the concentrate 262 back into the second processor 204'. Similar recirculation techniques may be implemented for the embodiments disclosed in relation to FIGS. 1-2 above.

The scope of the invention is not intended to be limited to the type or kind of batch process being implemented. For example, embodiments are envisioned in which the batch process may include the first and second processors 202, 204 being configured to process the enriched functionalized polymer coated collection filter 220 in relation to one type or kind of valuable material, and the first and second processors 202', 204' being configured to process the enriched functionalized polymer coated collection filter 220 in relation to either the same type or kind of valuable material, or a different type or kind of valuable material. Moreover, the scope of the invention is intended to include batch processes both now known and later developed in the future.

Figure 4A:
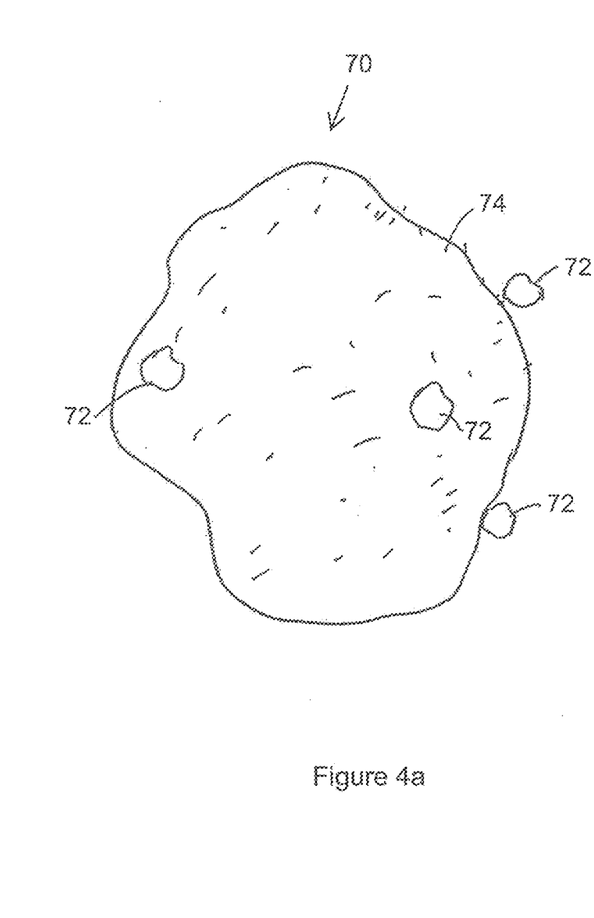
FIG. 4a shows at least part of a generalized solid-phase body, e.g., a functionalized polymer coated member, according to some embodiments of the present invention.
Figure 4B:
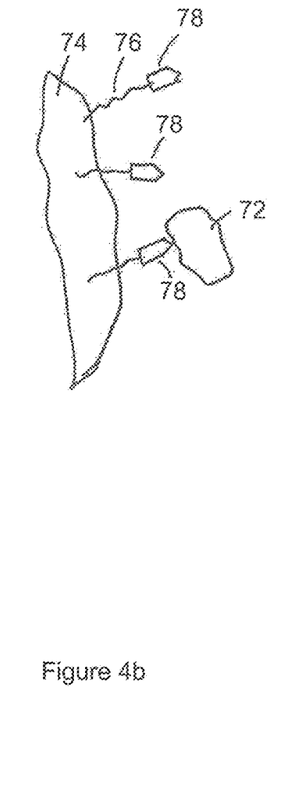
FIG. 4b illustrates an enlarged portion of the functionalized polymer coated member showing a molecule or molecular segment for attaching a function group to the surface of the functionalized polymer coated member, according to some embodiments of the present invention.

FIGS. 4a, 4b: The Synthetic Bead Chemistry

For aiding a person of ordinary skill in the art in understanding various embodiments of the present invention, FIG. 4a shows at least part of a generalized solid-phase body, e.g., a functionalized polymer coated member, and FIG. 4b shows an enlarged portion of the surface. As shown in FIGS. 4a and 4b, the functionalized polymer coated member 70 has a body to provide a surface 74. At least the outside part of the body may be made of a synthetic material, such as polymer, so as to provide a plurality of molecules or molecular segments 76 on the surface 74. The molecule 76 is used to attach a chemical functional group 78 to the surface 74. In general, the molecule 76 can be a hydrocarbon chain, for example, and the functional group 78 can have an anionic bond for attracting or attaching a mineral particle of interest, such as copper to the surface 74. A xanthate, for example, has both the functional group 78 and the molecular segment 76 to be incorporated into the polymer that is used to make the synthetic bead 70, or the surface thereof. The functional group 78 is also known as a collector that can have a neutral or charged functional group for attachment to the desired mineral, e.g., via a non-ionizing or ionizing bond. The charged functional group may include an ionizing bond that is anionic or cationic. An anionic bond or groups may include an oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines.

Similarly, a chelating agent can be incorporated into the polymer as a collector site for attracting a mineral, such as copper. As shown in FIG. 4b, a mineral particle 72 is attached to the functional group 78 on the molecule 76. In general, the mineral particle 72 is much smaller than the synthetic bead 70. Many mineral particles 72 can be attracted to or attached to the surface 74 of a functionalized polymer coated member 70.

In some embodiments of the present invention, a functionalized polymer coated member may take the form of a solid-phase body made of a synthetic material, such as polymer. (By way of example, the term "solid-phase body" is understood herein to be a body having a cohesive force of matter that is strong enough to keep the molecules or atoms in the given positions, restraining the thermal mobility.) The polymer can be rigid or elastomeric. An elastomeric polymer can be a bisoxazolone-based polymer, for example. The body has a surface comprising a plurality of molecules with one or more functional groups for attracting mineral particles of interest to the surface. A polymer having a functional group to attract or collect mineral particles is referred to as a functionalized polymer. By way of example, the entire body of the functionalized polymer coated member may be made of the same functionalized material, or the body may be a shell, which can be formed around an inner material.

It should be understood that the surface of a functionalized polymer coated member, according to the present invention, is not limited to an overall smoothness of its surface as shown in FIG. 4a. In some embodiments of the present invention, the surface can be irregular and rough. For example, the surface can have some physical structures like grooves or rods, or holes or dents. The surface can have some hair-like physical structures. In addition to the functional groups on the functionalized polymer coated member that attract mineral particles of interest to the surface, the physical structures can help trapping the mineral particles on the surface. The surface can be configured to be a honeycomb surface or a sponge-like surface for trapping the mineral particles and/or increasing the contacting surface. In effect, the scope of the invention is not intended to be limited to any particular type or kind of surface of the synthetic bead.

It should be noted that the functionalized polymer coated member of the present invention can be realized by a different way to achieve the same goal. Namely, it is possible to use a different means to attract the mineral particles of interest to the surface of the functionalized polymer coated member. For example, the surface of the polymer coated member can be functionalized with a hydrophobic chemical molecule or compound, as discussed below. Alternatively, the surface of the functionalized polymer coated member can be coated with hydrophobic chemical molecules or compounds. In the pulp slurry, xanthate and hydroxamate collectors can also be added therein for collecting the mineral particles and making the mineral particles hydrophobic. When the functionalized polymer coated member is used to collect the mineral particles in the pulp slurry having a pH value around 8-9, it is possible to release the mineral particles on the enriched synthetic beads from the surface of the functionalized polymer coated member in an acidic solution, such as a sulfuric acid solution. According to some embodiment, it may also be possible to release the mineral particles carried with the enriched functionalized polymer coated member by sonic agitation, such as ultrasonic waves, or simply by washing it with water.

FIGS. 5a-5e

Figure 5A:
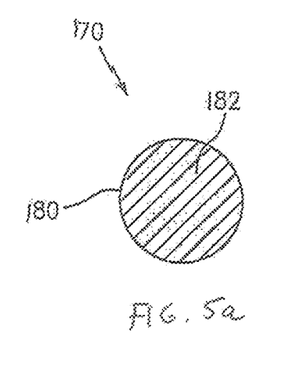
FIGS. 5a-5e illustrate a synthetic bead with different shapes and structures.
Figure 5B:
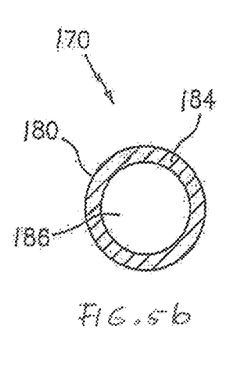
Figure 5C:
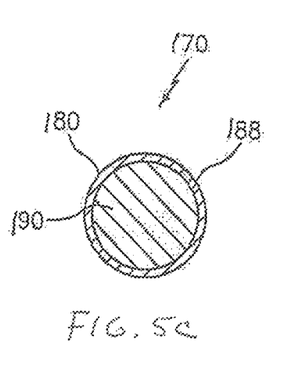

In some embodiments of the present invention, a synthetic bead has a solid-phase body made of a synthetic material, such as polymer. The polymer can be rigid or elastomeric. An elastomeric polymer can be polyisoprene or polybutadiene, for example. The synthetic bead 170 has a bead body 180 having a surface comprising a plurality of molecules with one or more functional groups for attracting mineral particles to the surface. A polymer having a functional group to collect mineral particles is referred to as a functionalized polymer. In one embodiment, the entire interior part 182 of the synthetic bead 180 is made of the same functionalized material, as shown in FIG. 5a. In another embodiment, the bead body 180 comprises a shell 184. The shell 184 can be formed by way of expansion, such as thermal expansion or pressure reduction. The shell 184 can be a micro-bubble or a balloon. In FIG. 5b, the shell 184, which is made of functionalized material, has an interior part 186. The interior part 186 can be filled with air or gas to aid buoyancy, for example. The interior part 186 can be used to contain a liquid to be released during the mineral separation process. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell 184 can be used to encapsulate a powder which can have a magnetic property so as to cause the synthetic bead to be magnetic, for example. The encapsulated liquid or powder may contain monomers, oligomers or short polymer segments for wetting the surface of mineral particles when released from the beads. For example, each of the monomers or oligomers may contain one functional group for attaching to a mineral particle and an ion for attaching the wetted mineral particle to the synthetic bead. The shell 184 can be used to encapsulate a solid core, such as Styrofoam to aid buoyancy, for example. In yet another embodiment, only the coating of the bead body is made of functionalized polymer. As shown in FIG. 5c, the synthetic bead has a core 190 made of ceramic, glass or metal and only the surface of core 190 has a coating 188 made of functionalized polymer. The core 190 can be a hollow core or a filled core depending on the application. The core 190 can be a micro-bubble, a sphere or balloon. For example, a filled core made of metal makes the density of the synthetic bead to be higher than the density of the pulp slurry, for example. The core 190 can be made of a magnetic material so that the para-, ferri-, ferro-magnetism of the synthetic bead is greater than the para-, ferri-, ferro-magnetism of the unwanted ground ore particle in the mixture. In a different embodiment, the synthetic bead can be configured with a ferro-magnetic or ferri-magnetic core that attract to paramagnetic surfaces. A core 90 made of glass or ceramic can be used to make the density of the synthetic bead substantially equal to the density of the pulp slurry so that when the synthetic beads are mixed into the pulp slurry for mineral collection, the beads can be in a suspension state.

Figure 5D:
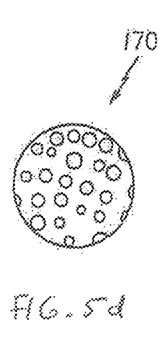
Figure 5E:
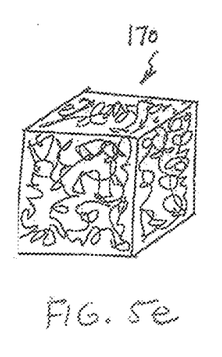

According to a different embodiment of the present invention, the synthetic bead 170 can be a porous block or take the form of a sponge or foam with multiple segregated gas filled chambers as shown in FIGS. 5*d* and 5*e*. A foam is an example of an open-cell structure. An open-cell foam can be made from reticulated polyurethane.

Applications

The scope of the invention is described in relation to mineral separation, including the separation of copper from ore.

By way of example, applications are envisioned to include

Rougher, scavenger, cleaner and rougher/scavenger separation cells in the production stream, replacing the traditional flotation machines.

Tailings scavenger cells used to scavenge the unrecovered minerals from a tailings stream.

Tailings cleaning cell used to clean unwanted material from the tailings stream before it is sent to the disposal pond.

Tailings reclamation machine that is placed in the tailings pond to recover valuable mineral that has been sent to the tailings pond.

Other types or kinds of valuable material or minerals of interest, including gold, molybdenum, etc.

However, the scope of the invention is intended to include other types or kinds of applications either now known or later developed in the future, including applications related to oilsands separation that includes separating bitumen from sand and water in the recovery of bitumen in an oilsands mining operation.

The Scope of the Invention

It should be further appreciated that any of the features, characteristics, alternatives or modifications described regarding a particular embodiment herein may also be applied, used, or incorporated with any other embodiment described herein. Although the invention has been described and illustrated with respect to exemplary embodiments thereof, the foregoing and various other additions and omissions may be made therein and thereto without departing from the scope of the present invention.

What is claimed is:

1. An apparatus comprising:
a substrate arranged to contact an aqueous slurry, the aqueous slurry containing minerals and unwanted materials, the minerals comprising hydrophobic or hydrophobized mineral particles; and
a polymeric coating disposed on the substrate, the polymeric coating comprising a compliant and tacky surface, the polymeric coating further comprising a chemical to render the compliant and tacky surface hydrophobic so as to attract the hydrophobic or hydrophobized mineral particles, the polymeric coating comprising a silicone modified with a material selected from the group consisting of tackifiers; plasticizers; crosslinking agents; hexamethyldisilazane; fumed hydrophobic silica; and MQ resin, the compliant and tacky surface having a contact angle $\theta_C$ with water greater than 120 degrees, and the contact angle $\theta_C$ being an equilibrium contact angle $\theta_C$ that reflects a relative strength of a liquid, solid and vapor molecular interaction and that is determined by Young's Equation, as follows:

$$Y_{SG} - Y_{SL} - Y_{LG} \cos \theta_C = 0,$$

where solid-vapor interfacial energy is denoted by $Y_{SG}$, solid-liquid interfacial energy is denoted by $Y_{SL}$, and liquid-vapor interfacial energy is denoted by $Y_{LG}$.

2. The apparatus according to claim 1, wherein the chemical comprises a siloxane derivative.

3. The apparatus according to claim 1, wherein the polymeric coating has a thickness ranged from 0.2 mils to 5.0 mils.

4. The apparatus according to claim 1, wherein the compliant and tacky surface has a tacky scale as measured by loop tack against polished stainless steel using PSTC-16 Method A with loop tack in a range of 5 to 600 grams-force.

5. The apparatus according to claim 1, wherein the polymeric coating is reacted with an additional functionality including an oxyhydryl, sulfhydryl, or cationic functionality found in mineral collectors.

6. The apparatus according to claim 1, wherein the substrate comprises a flat surface.

7. The apparatus according to claim 1, wherein the substrate comprises a belt.

8. The apparatus according to claim 1, wherein the substrate comprises a bead.

9. The apparatus according to claim 1, wherein the substrate comprises a mesh or a filter.

10. The apparatus according to claim 1, wherein the substrate comprises an open-cell foam.

11. The apparatus according to claim 1, wherein the substrate comprises an impeller.

12. The apparatus according to claim 1, wherein the substrate comprises an open-cell foam made from reticulated polyurethane.

13. The apparatus according to claim 1, wherein the substrate comprises an open-cell foam made from a material selected from the group consisting of silicone, polychloroprene, polyisocyanurate, polystyrene, polyolefin, polyvinylchloride, epoxy, latex, fluoropolymer, phenolic, EPDM, and nitrile.

14. The apparatus according to claim 1, wherein the substrate comprises a three-dimensional open cellular structure made of hard plastic.

15. The apparatus according to claim 1, wherein the substrate comprises a solid, hollow, or network structure made of glass, metal, ceramic or polymer.

16. The apparatus according to claim 1, wherein the minerals comprise copper, gold, lead, zinc, nickel and iron, and wherein the minerals are further hydrophobized by addition of collector chemicals to the aqueous slurry, wherein the collector chemicals are selected from the group consisting of xanthate, dithiophosphate, dithiophosphinate, dithiocarbamate, thionocarbamate, hydroxamates, amine ethers, primary amines, fatty acids, and salts thereof.

17. The apparatus of claim 1, wherein the unwanted materials in the slurry include gangue, and hydrophobicity of the gangue is reduced by addition of depressants in the slurry, wherein depressants are selected from the group consisting of cyanide, zinc sulfate, sulfur dioxide, sodium hydrosulfide, sodium sulfide, Nokes reagent, phosphates, diethylenetriamine, triethylenetetramine, amphiphilic polymers based on polyacrylamide, starch, dextrin, tannin, quebracho, and lignosulfonates.

18. The apparatus according to claim 1, wherein the polymeric coating is further formed from a material selected from the group consisting of ethylene vinyl acetate; styrene block copolymers with ethylene, propylene, and/or isoprene; and polyvinyl ethers, the polymer coating further modified with a substance selected from the group consisting of clays, bentonite, oligomeric plasticizers and POSS materials.

19. An apparatus comprising:
a substrate arranged to contact an aqueous slurry, the aqueous slurry containing minerals and unwanted materials, the minerals comprising hydrophobic or hydrophobized mineral particles; and
a polymeric coating disposed on the substrate, the polymeric coating comprising a compliant and tacky surface, the polymeric coating further comprising a chemical to render the compliant and tacky surface hydrophobic so as to attract the hydrophobic or hydrophobized mineral particles, the polymeric coating comprising a polymer modified with a material selected from the group consisting of tackifiers; plasticizers; crosslinking agents; hexamethyldisilazane; fumed hydrophobic silica; and MQ resin, wherein the polymer is selected from the group consisting of butyl rubber; ethylene vinyl acetate; natural rubber; nitriles; styrene block copolymers with ethylene, propylene, and/or isoprene; polyurethanes; and polyvinyl ethers, the compliant and tacky surface having a contact angle $\theta_C$ with water greater than 120 degrees, and the contact angle $\theta_C$ being an equilibrium contact angle $\theta_C$ that reflects a relative strength of a liquid, solid and vapor molecular interaction and that is determined by Young's Equation, as follows:

$$Y_{SG} - Y_{SL} - Y_{LG} \cos \theta_C = 0,$$

where solid-vapor interfacial energy is denoted by $Y_{SG}$, solid-liquid interfacial energy is denoted by $Y_{SL}$, and liquid-vapor interfacial energy is denoted by $Y_{LG}$.

20. The apparatus according to claim 19, wherein the polymeric coating is reacted with an additional functionality including an oxyhydryl, sulfhydryl, or cationic functionality found in mineral collectors.

21. The apparatus according to claim 19, wherein the substrate comprises an open-cell foam.

22. The apparatus according to claim 19, wherein the substrate comprises an open cell foam made from a material selected from the group consisting of silicone, polychloroprene, polyisocyanurate, polystyrene, polyolefin, polyvinylchloride, epoxy, latex, fluoropolymer, phenolic, EPDM, and nitrile.

23. The apparatus according to claim 19, wherein the chemical comprises poly (dimethylsiloxane) and the substrate comprises a three-dimensional structure selected from polypropylene honeycombs, ceramic foams, and carbon fiber.

* * * * *